United States Patent
Park et al.

(10) Patent No.: US 7,851,557 B2
(45) Date of Patent: Dec. 14, 2010

(54) ORGANIC/INORGANIC COMPOSITE ELECTROLYTE MEMBRANES USING ZEOLITE AND FUEL CELL COMPRISING THE SAME

(75) Inventors: Yong Su Park, Daejeon (KR); Chong Kyu Shin, Daejeon (KR); Kwon Nam Sohn, Daejeon (KR); Bong Keun Lee, Daejeon (KR); Jae Hyuk Chang, Daejeon (KR); Eun Ju Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 608 days.

(21) Appl. No.: 11/812,536

(22) Filed: Jun. 19, 2007

(65) Prior Publication Data

US 2008/0070094 A1    Mar. 20, 2008

(30) Foreign Application Priority Data

Jun. 20, 2006  (KR) .............................. 2006-55620

(51) Int. Cl.
  *H01M 8/10* (2006.01)
(52) U.S. Cl. ............... 525/326.1; 525/328.4; 429/30; 429/33; 521/27; 204/296
(58) Field of Classification Search .......... 525/326.1, 525/328.4; 521/27; 429/30, 33; 204/296
See application file for complete search history.

(56) References Cited

U.S. PATENT DOCUMENTS

| | | | | |
|---|---|---|---|---|
| 5,516,831 A * | 5/1996 | Pottick et al. | ............... | 524/474 |
| 5,631,100 A * | 5/1997 | Yoshino et al. | ............... | 429/62 |
| 6,248,469 B1 * | 6/2001 | Formato et al. | ............... | 429/41 |
| 6,962,959 B2 * | 11/2005 | Kurano et al. | ............ | 525/326.1 |
| 7,138,017 B2 * | 11/2006 | Kaneko et al. | ............... | 148/101 |
| 7,582,373 B2 * | 9/2009 | Shirono et al. | ............... | 429/30 |

FOREIGN PATENT DOCUMENTS

KR    10-2003-0032321 A    4/2003

* cited by examiner

*Primary Examiner*—Peter D. Mulcahy
*Assistant Examiner*—Henry Hu
(74) *Attorney, Agent, or Firm*—McKenna Long & Aldridge

(57) ABSTRACT

Disclosed is an organic/inorganic composite electrolyte membrane comprising: (a) a sulfonated fluorine-free hydrocarbon-based polymer; and (b) inorganic particles capable of collecting moisture, wherein the inorganic particles include zeolite. Also, disclosed are an electrode comprising the zeolite as a component for forming a catalyst layer, a membrane electrode assembly comprising the electrolyte membrane and/or the electrode, and a fuel cell having the membrane electrode assembly. The organic/inorganic composite electrolyte membrane using the hydrophilic zeolite in combination with the sulfonated fluorine-free hydrocarbon-based polymer shows high proton conductivity, and thus can impart excellent quality to a fuel cell even under high-temperature and low-humidity conditions.

10 Claims, 3 Drawing Sheets

ORGANIC/INORGANIC COMPOSITE ELECTROLYTE MEMBRANES USING ZEOLITE AND FUEL CELL COMPRISING THE SAME

This application claims the benefit of the filing date of Korean Patent Application No. 2006-55620, filed on Jun. 20, 2006, in the Korean Intellectual Property Office, the disclosure of which is incorporated herein in its entirety by reference.

TECHNICAL FIELD

The present invention relates to an organic/inorganic composite electrolyte membrane that can impart excellent proton conductivity to a fuel cell, even under high-temperature and low-humidity conditions, and a fuel cell having improved quality by using the electrolyte membrane.

BACKGROUND ART

In general, a fuel cell is an energy conversion device converting chemical energy of fuel directly into electric energy. Such fuel cells have been intensively studied and developed as next-generation energy sources since fuel cells have high energy efficiency and cause little environmental pollution, and thus are eco-friendly.

Among such fuel cells, polymer electrolyte membrane fuel cells (PEMFCs) have been spotlighted as portable, vehicle or household electric power sources. This is because PEMFCs are advantageous in that they have a low driving temperature, avoid a water leakage problem caused by the use of solid electrolytes and have a high response rate. Additionally, PEMFCs are high-output fuel cells with a high current density as compared to other types of fuel cells, have a simple structure, and show high start and response characteristics. Further, PEMFCs allow the use of methanol or natural gas other than hydrogen as fuel, and have excellent durability. Moreover, PEMFCs allow downsizing thereof by virtue of their high output density, and thus have been studied continuously to be applied as portable fuel cells.

A polymer electrolyte membrane fuel cell comprises two electrodes and a polymer membrane functioning as an electrolyte. In general, a polymer membrane having a sulfonic acid group ($-SO_3H$) introduced thereto has been used as the polymer membrane. While conventional sulfonic acid group-containing polymer electrolyte membranes show high conductivity and impart excellent quality to fuel cells under sufficiently humidified conditions, they undergo a rapid drop in the proton conductivity as the moisture content contained therein decreases, and thus cause significant degradation in the quality of a fuel cell under low-humidity conditions. Therefore, fuel cells using such conventional polymer electrolyte membranes need strict water control and a complicated system so as to be used at a high temperature of 100° C. or higher.

To solve the above-mentioned problem, many attempts have been made to develop various kinds of organic/inorganic composite electrolyte membranes by adding inorganic proton conducting fillers having high proton conductivity and hygroscopic property to organic polymers. However, such attempts are not applicable under low-humidity conditions use yet.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
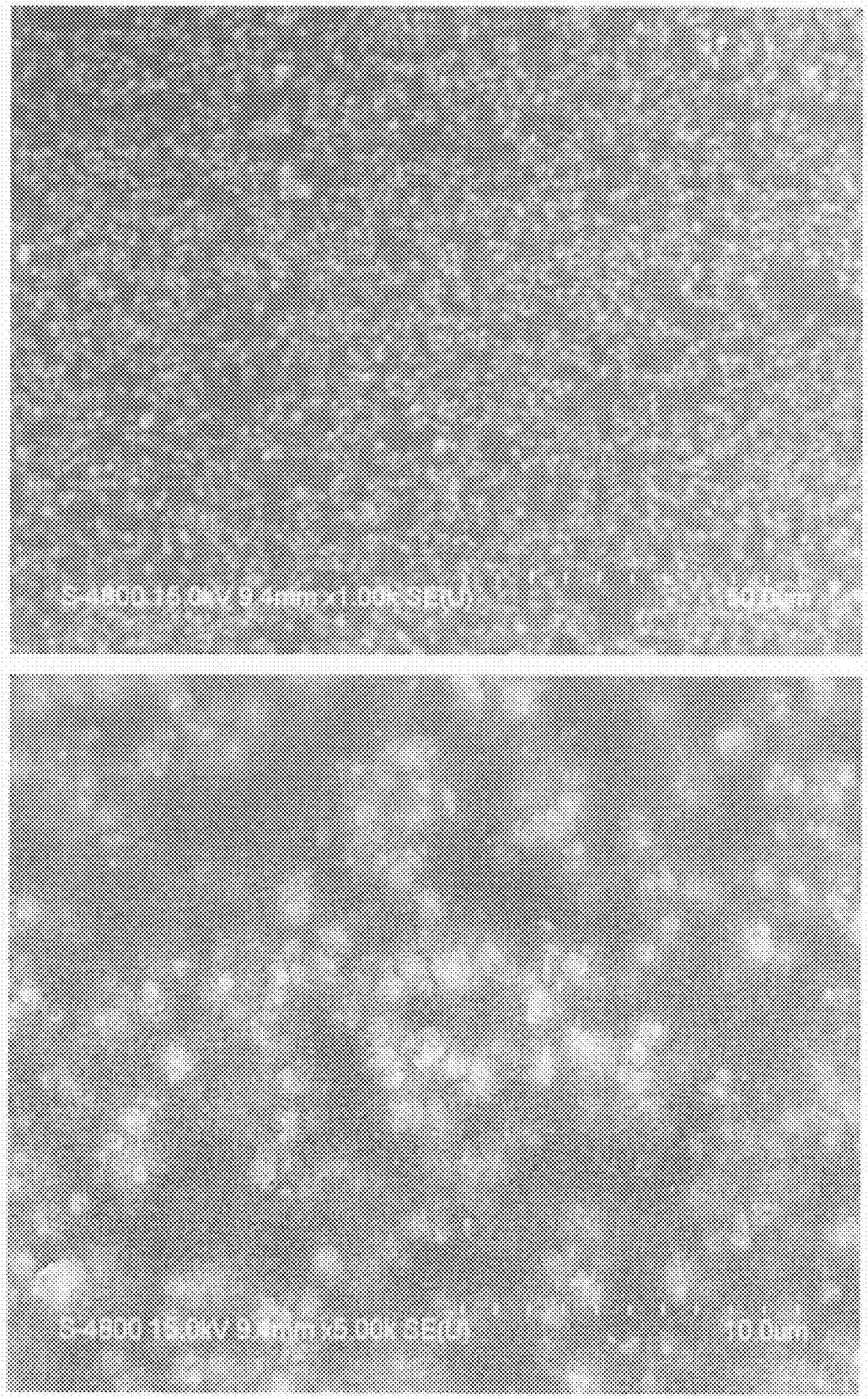
FIG. 1 is a photographic view showing the distribution of zeolite in the organic/inorganic composite electrolyte membrane according to the present invention, taken by scanning electron microscopy (SEM)

Therefore, the present invention has been made in view of the above-mentioned problems. The inventors of the present invention have found that when an organic/inorganic composite electrolyte membrane is formed by using zeolite as hydrophilic inorganic particles in combination with a sulfonated fluorine-free polymer, the organic/inorganic composite electrolyte membrane shows excellent proton conductivity even under high-temperature and low-humidity conditions due to the combined water collecting function of the inorganic particles and the polymer.

The present invention is based on this finding.

In order to achieve the above-mentioned object, the present invention provides an organic/inorganic composite electrolyte membrane comprising: (a) a sulfonated fluorine-free hydrocarbon-based polymer; and (b) inorganic particles capable of collecting moisture, wherein the inorganic particles include zeolite. Also, the present invention provides a membrane electrode assembly (MEA) comprising the electrolyte membrane and a fuel cell having the membrane electrode assembly.

Further, the present invention provides an electrode having a catalyst layer comprising zeolite on either surface of both surfaces of a gas diffusion layer, a membrane electrode assembly comprising the electrode, and a fuel cell having the membrane electrode assembly.

Hereinafter, the present invention will be explained in more detail.

Different fuel cells operate in different temperature ranges. For example, a direct methanol fuel cell (DMFC) operates at a temperature of at most 80° C. (30~80° C.), which is a vaporization temperature of methanol, to prevent evaporation of methanol used as fuel. However, a polymer electrolyte membrane fuel cell (PEMFC) operates at a temperature lower or higher than 130° C., and preferably at a high temperature of 60~130° C. Under such medium/high temperature ranges, moisture content of an electrolyte membrane decreases to cause a low-humidity condition, resulting in a rapid drop in the proton conductivity of the electrolyte membrane.

Meanwhile, Nafion, a conventional sulfonated fluoropolymer, shows excellent proton conductivity under such medium/high-temperature and low-humidity conditions. This is because the above polymer includes sulfone groups and fluorine-containing groups ($CF_2$) linked continuously to each other, and thus has a maximized acidity (pKa). However, since the Nafion membrane contains fluorine in itself, it generates HF, a kind of strong acid, during the operation of the fuel cell, and the HF generated thereby causes corrosion of metal members forming the fuel cell, resulting in degradation of the quality and safety of the fuel cell.

Under these circumstances, the composite electrolyte membrane according to the present invention uses hydrophilic zeolite in combination with a fluorine-free hydrocarbon-based polymer, so as to provide excellent proton conductivity comparable to the proton conductivity of the conventional Nafion membrane under high-temperature and low-humidity conditions, and to solve the problem of the aforementioned limitation in the use of metal members caused by the fluoropolymer.

The organic/inorganic composite electrolyte membrane according to the present invention comprises zeolite particles distributed uniformly on the sulfonated fluorine-free hydrocarbon-based polymer matrix (see FIG. 1).

The sulfonated fluorine-free hydrocarbon-based polymer functioning as the matrix for the electrolyte membrane can collect moisture due to the sulfone groups contained therein, and facilitates proton conduction through the electrolyte membrane. Additionally, zeolite has a polyhedral structure including $(Si,Al)O_4$ tetrahedrons, one of the crystallographic basic units, linked three dimensionally to each other, and all oxygen atoms present in one $(Si,Al)O_4$ tetrahedron are shared by another tetrahedron. Thus, oxygen atoms forming such a three-dimensional polyhedral structure have a polarity, and can collect the surrounding moisture by attracting the moisture also having a polarity via an electrostatic attraction force. By doing so, it is possible to significantly improve movement of $H^+$ ions. In addition to the aforementioned hydrophilic characteristics, zeolite has a microporous structure including a plurality of pores therein, and thus can collect moisture so that the moisture is incorporated therein.

Therefore the hydrophilic zeolite used for forming the electrolyte membrane and the hydrophilic sulfonated fluorine-free hydrocarbon-based polymer cooperate with each other to attract moisture and to form a kind of proton conductive channel, and thus can provide excellent proton conductivity even under high-temperature and low-humidity conditions.

In fact, it can be seen from the following experimental example that the organic/inorganic composite electrolyte membrane according to the present invention shows higher proton conductivity as compared to the conventional Nafion membrane under a low-humidity (relative humidity 40%) condition (see the following Table 1).

One of the constitutional elements forming the organic/inorganic composite electrolyte membrane according to the present invention is zeolite. There is no particular limitation in the zeolite, as long as the zeolite is known to those skilled in the art and is currently used in the art. For reference, the zeolite is also referred to as an alkali metal and/or alkaline earth metal aluminosilicate hydrate herein.

As mentioned above, zeolite belongs to tektosilicates having a three-dimensional network structure formed by $(Si,Al)O_4$ tetrahedrons, wherein the $(Si,Al)O_4$ tetrahedron is a kind of basic unit of tektosilicates and oxygen atoms of one tetrahedron are shared by another tetrahedron. Therefore, the zeolite can collect moisture due to its structural characteristics as described above. Herein, it is preferable that the zeolite has a certain acidity to improve its water collecting function. Preferably, the zeolite has an acidity (pH) of 1~4, but is not limited thereto. Additionally, the zeolite can impart excellent chemical resistance and thermal stability to the electrolyte membrane.

Non-limiting examples of the zeolite that may be used in the present invention include ZSM-5, zeolite A, zeolite X, zeolite Y, mordenite, $AlPO_4$, SAPO, MeAlPO, SAPO-5, XSM-5, AlPO-5, VPI-5, MCM-41, chabazite, clipptiolite, silica gel, zirconium-containing minerals, titanium-containing minerals, silicates or mixtures thereof.

The size (particle diameter), porosity and/or pore size of the zeolite may be controlled adequately to enhance the water collecting function of the zeolite, and there is no particular limitation therein. For example, the zeolite has a size (diameter) of 0.1 nm~1 μm, and preferably of 1 nm~500 nm. Also, the zeolite may be used in an amount of 0.1~1000 parts by weight based on 100 parts by weight of the sulfonated fluorine-free hydrocarbon-based polymer, but is not limited thereto.

The other constitutional element forming the organic/inorganic electrolyte membrane according to the present invention is a fluorine-free hydrocarbon-based polymer containing no fluorine atom and having hydrophilic sulfonic acid functional groups.

Conventional sulfonated fluoropolymers have low industrial applicability despite their excellent quality because they are expensive. Additionally, the sulfonated fluoropolymers show high methanol crossover caused by methanol penetrating through a polymer membrane, and cause a drop in efficiency at a temperature higher than 80° C. Further, because the sulfonated fluoropolymers generate HF, they cause a limitation in the use of metallic members (e.g. bipolar plate) for forming a fuel cell.

On the contrary, the organic/inorganic composite electrolyte membrane according to the present invention uses a sulfonated fluorine-free hydrocarbon-based polymer, and thus inhibits methanol crossover and improves the availability of a catalyst and the safety of a fuel cell. Additionally, the organic/inorganic composite electrolyte membrane uses cost-efficient materials, and shows excellent cost-efficiency and productivity. Further, since the polymer generates no HF, metallic members, such as metallic bipolar plates, can be used for forming a fuel cell with no particular limitation.

The sulfonic acid groups contained in the polymer comprise $SO3^-$ ions and $H^+$ ions bonded strongly to each other via ionic bonds, and have strong hydrophilicity to attract water molecules. Such water collection results in a local hydration phenomenon, followed by significantly decreased ionic bonds between $SO3^-$ ions and $H^+$ ions. Thus, the polymer can facilitate movement of $H^+$ ions.

Non-limiting examples of the sulfonated fluorine-free hydrocarbon-based polymer that may be used in the present invention include at least one polymer selected from the group consisting of sulfonated polyaryleneether (PAE), sulfonated polyaryleneetheretherketone (PAEEK), sulfonated polyaryleneetherethersulfone (PAEES), sulfonated polyazole, sulfonated polyvinylalcohol (PVA), sulfonated polyphenylene oxide, sulfonated polyphenylene sulfide, sulfonated polysulfone, sulfonated polycarbonate, sulfonated polystyrene, sulfonated polyimide, sulfonated polyamide, sulfonated polyquinoxaline, sulfonated (phosphated) polyphosphazene and sulfonated polybenzimidazole; block copolymers, multiblock copolymers or graft copolymers comprising the above polymers, or the like.

Preferably, the sulfonated fluorine-free hydrocarbon-based polymer is a block copolymer including blocks enriched with hydrophilic functional groups, such as sulfonic acid groups. More preferably, the sulfonated fluorine-free hydrocarbon-based polymer is a sulfonated multiblock copolymer comprising the repeating units represented by the following Formula 1. The multiblock copolymer allows hydrophilic groups and hydrophobic groups to be gathered selectively from each other, contrary to the conventional random copolymers. Thus, the multiblock copolymer can help the hydrophilic groups to form a proton conductive channel, and can help the hydrophobic groups improve the chemical stability of the polymer.

[Formula 1]

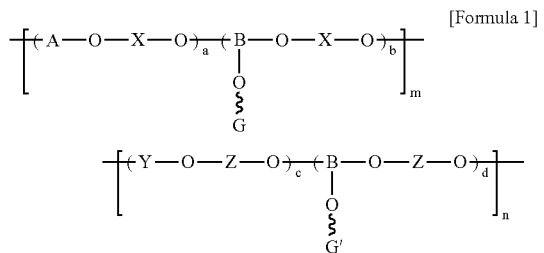

wherein each of A, X and Y independently represents

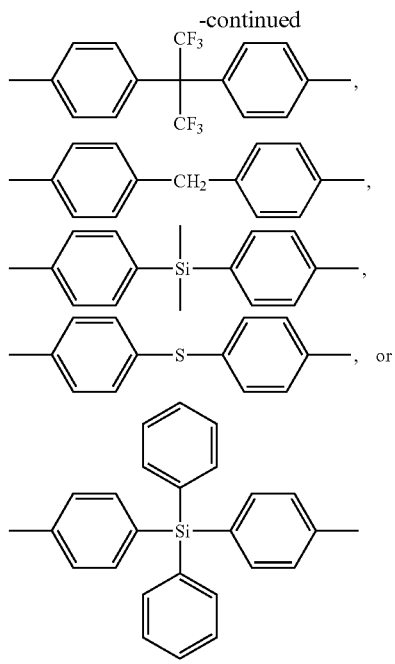

(wherein R is —NO$_2$ or —CF$_3$);

Z is

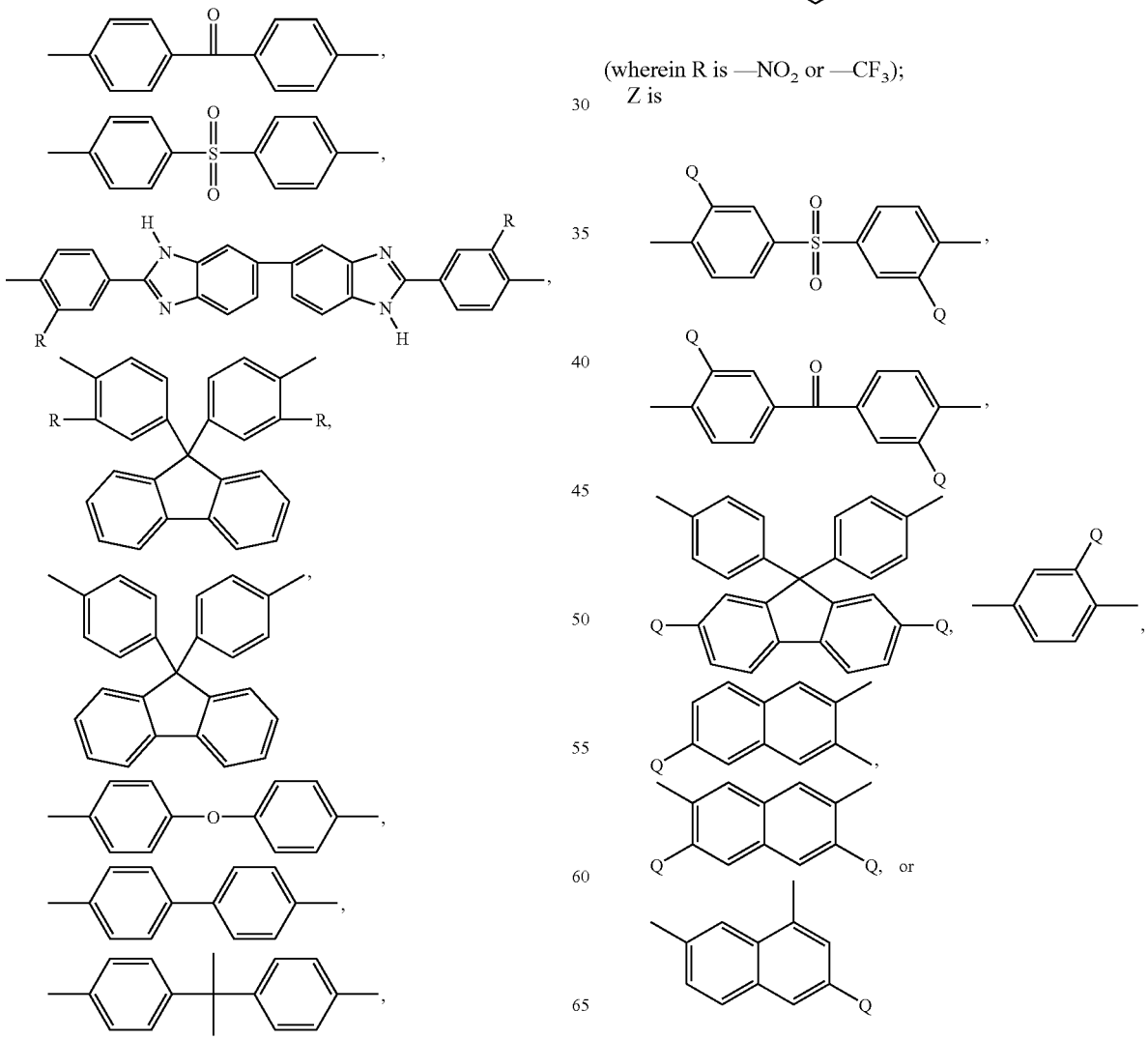

(wherein Q is —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, and M is Na or K);
B is

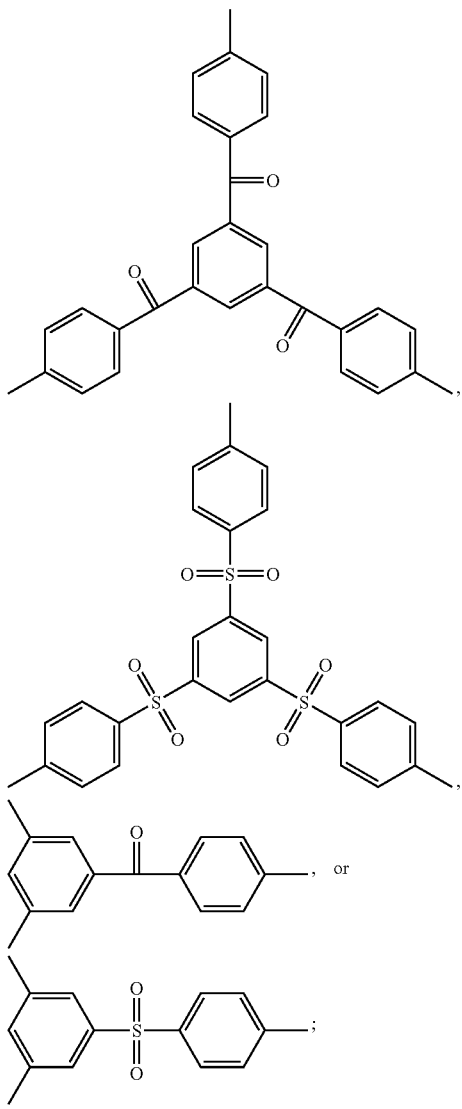

G is X;
G' is Z;
0<b/a<1;
0<d/c<1;
1≦m<100; and
1≦n<100.

The branched sulfonated multiblock copolymer represented by Formula 1 can be obtained via the polymerization of branched hydrophobic blocks having no acid substituents with branched hydrophilic blocks having acid substituents with no need for carrying out post-sulfonation or crosslinking of a sulfonated polymer.

The repeating unit represented by Formula 1 is formed via the chemical bonds between hydrophobic blocks that allow maintenance of the mechanical integrity of a membrane and hydrophilic blocks that impart ion conductivity to the membrane, each hydrophobic block alternating with the hydrophilic block. Therefore, the resultant multiblock copolymer has high proton conductivity, mechanical properties and chemical stability, and allows easy control of the distribution, number and position of the sulfonic acid groups in its backbone. Additionally, the multiblock copolymer can form an electrolyte membrane while not adversely affecting the physical properties due to the increased number of sulfonic acid groups.

The sulfonated multiblock copolymer comprising the repeating units represented by Formula 1 can be prepared by the method as described in Korean Patent Application No. 2004-110487.

In addition to the above constitutional elements, the organic/inorganic composite electrolyte membrane according to the present invention may further comprise other components, additives, or the like, generally known to those skilled in the art. There is no particular limitation in the thickness of the organic/inorganic composite electrolyte membrane, and the organic/inorganic composite electrolyte membrane may have a thickness controlled adequately to improve the quality and safety of a fuel cell.

The organic/inorganic composite electrolyte membrane according to the present invention can be obtained by using a method generally known to those skilled in the art. In a preferred embodiment, the method comprises the steps of: (a) dissolving a sulfonated fluorine-free hydrocarbon-based polymer into a solvent to provide a polymer solution and adding zeolite thereto to form a dispersion; and (b) forming an organic/inorganic composite electrolyte membrane by using the composite solution.

The solvent used in the method preferably has a solubility parameter similar to the solubility parameter of the polymer to be used and a low boiling point. However, selection of the solvent is not limited thereto, and any conventional solvent known to those skilled in the art may be used.

To disperse the zeolite in the polymer solution, conventional dispersion processes known to those skilled in the art may be used. For example, agitation and sonication are performed continuously for about 1~50 hours. There is no particular limitation in the mixing ratio of the composite solution formed of the zeolite and the polymer, as long as the composite solution forms a membrane with high proton conductivity. At this time, other additives may be added to the solution to maintain an adequate level of viscosity.

There is no particular limitation in the method for forming an organic/inorganic composite electrolyte membrane by using the composite solution. For example, the composite solution is coated onto a substrate, followed by drying, and then the substrate is removed. To perform the coating, conventional coating processes including dip coating, die coating, roll coating, comma coating or doctor blade coating processes may be used.

Then, the resultant composite electrolyte membrane is introduced into an acid solution, followed by heating, so that SO$_3^+$Na$^-$ in the polymer can be converted into SO$_3$H. In other words, the hydrophilic moiety present in the salt form is converted into the H-form so that it can serve as a conductor. Herein, there is no particular limitation in the kind of the acid and the heating temperature. For example, the heating step may be performed at 80~90° C.

The organic/inorganic composite electrolyte membrane obtained as described above may be used in an electrochemical device, and preferably in an electrolyte for a fuel cell. More preferably, the organic/inorganic composite electrolyte membrane is used as an electrolyte for a polymer electrolyte membrane fuel cell (PEMFC) operating at a high temperature.

According to another aspect of the present invention, there is provided an electrode having a catalyst layer comprising zeolite on either surface of both surfaces of a gas diffusion layer (GDL). The electrode is an electrode inducing an electrochemical reaction by the action of a catalyst, and includes a cathode or anode for a fuel cell.

There is no particular limitation in the content of the zeolite in the catalyst layer, as long as the zeolite allows formation of the electrode on the gas diffusion layer and provides an excellent water collecting effect. For example, the zeolite is used in an amount of 0.1~1000 parts by weight per 100 parts by weight of a binder.

The catalyst layer includes a conventional binder polymer known to those skilled in the art, as a component for fixing and connecting the electrode catalyst and zeolite to the gas diffusion layer. Particular examples of the binder polymer that may be used in the present invention include polytetrafluoroethylene (PTFE) and/or fluoroethylene copolymer, or the like. Particularly, the binder polymer preferably has at least one hydrophilic functional group selected from sulfonic acid groups, phosphoric acid groups and carboxylic acid groups, in order to form a stable proton conduction channel among the electrode catalyst, the polymer and the zeolite. For example, the binder polymer includes a sulfonated fluorine-free polymer and/or fluoropolymer.

The electrode according to the present invention may be obtained by using a conventional method generally known to those skilled in the art. For example, catalyst ink comprising a noble metal-based catalyst, zeolite, a proton conductive material and a mixed solvent for enhancing dispersion of the catalyst is applied onto the gas diffusion layer, followed by drying, to provide an electrode having a catalyst layer formed thereon. Herein, the catalyst ink may be applied onto the gas diffusion layer via a conventional process, such as a printing, spraying, rolling or brushing process.

There is no particular limitation in the gas diffusion layer as long as the gas diffusion layer is a substrate having conductivity and a porosity of at least 80%. For example, carbon paper or carbon fiber fabric may be used as the gas diffusion layer.

Particular examples of the catalyst that may be used in the catalyst layer of the cathode in both electrodes include a catalyst comprising noble metal-based catalyst powder supported on the surface of conductive carbon powder. The noble metal-based catalyst includes Pt, W, Ru, Mo, Pd and a combination thereof. To increase the specific surface area of the catalyst and to improve the catalytic reaction efficiency, micronized carbon powder, such as carbon black, carbon nanotubes or carbon nanohorns, may be used. Also, particular examples of the catalyst that may be used in the catalyst of the anode include Pt or Pt-based alloy powder, such as Pt/Ru. However, the scope of the present invention is not limited to the above examples of the catalyst.

According to still another aspect of the present invention, there is provided a membrane electrode assembly comprising: (a) a first electrode having a first catalyst layer; (b) a second electrode having a second catalyst layer; and (c) an electrolyte membrane interposed between the first electrode and the second electrode, the membrane electrode assembly comprising either or both of the above-described organic/inorganic composite electrolyte membrane and the electrode having a catalyst layer containing zeolite. Herein, one of the first electrode and the second electrode is the cathode and the other is the anode.

The membrane electrode assembly is referred to as an assembly of an electrode for carrying out an electrochemical catalytic reaction between fuel and air with a polymer membrane for carrying out proton transfer. The membrane electrode assembly is a monolithic unit having a catalyst-containing electrode adhered to an electrolyte membrane.

In the membrane electrode assembly, each of the catalyst layers of the anode and cathode is in contact with the electrolyte membrane. The MEA can be manufactured by a conventional method known to one skilled in the art. For example, the electrolyte membrane is disposed between the anode and cathode to form an assembly. Next, the assembly is inserted into the gap between two hot plates operated in a hydraulic manner while maintaining a temperature of about 140° C., and then pressurized to perform hot pressing.

A preferred embodiment of the method for manufacturing the membrane electrode assembly comprises the steps of: (a) forming an organic/inorganic composite electrolyte membrane by using a sulfonated fluorine-free hydrocarbon-based polymer and zeolite; (b) applying catalyst slurry containing a zeolite dispersion onto a gas diffusion layer (GDL) to provide an electrode; and (c) hot pressing the electrolyte membrane of step (a) and the electrode of step (b) to provide a membrane electrode assembly. Particularly, when the zeolite-containing electrolyte membrane is used in combination with the electrode, the resultant MEA shows significantly improved proton conductivity by virtue of their water collecting functions, thereby significantly improving the quality of the fuel cell.

According to yet another aspect of the present invention, there is provided a fuel cell comprising the above membrane electrode assembly.

The fuel cell may be manufactured by using the above membrane electrode assembly and a bipolar plate in a conventional manner known to one skilled in the art.

The fuel cell may be a polymer electrolyte fuel cell or direct liquid fuel cell whose cathodic reaction is oxygen reduction, but is not limited thereto. And particular examples of such direct liquid fuel cell include a direct methanol fuel cell, direct formic acid fuel cell, direct ethanol fuel cell, and/or direct dimethyl ether fuel cells. Particularly, the polymer electrolyte fuel cell (PEMFC) which works under the condition with high temperature and low humidity is preferred.

Reference will now be made in detail to the preferred embodiments of the present invention. It is to be understood that the following examples are illustrative only and the present invention is not limited thereto.

EXAMPLE 1

1-1. Preparation of Organic/Inorganic Composite Electrolyte Membrane

First, 4.5 g of a preliminarily prepared sulfonated PAEEK (the polymer obtained according to Example 2 of Korean Patent Application No. 2004-0110487) was added to DMF at room temperature, the solution was agitated for about 2 hours and the state of the solution was observed. Next, 0.5 g of ZSM-5 was added to the solution, followed by continuous agitation. Agitation and sonication were applied continuously to reach a completely dispersed state. A desired dispersion was obtained in one hour to 50 hours. Then, the dispersion was purified to obtain a dispersed composite solution.

The above composite dispersion was subjected to casting by using doctor blade processing onto a glass plate pretreated with an acid, and the solvent was allowed to evaporate in an oven at a temperature of 80° C. or higher to form a film. Such treatment was repeated two or three times to control the thickness of the film to a desired level. The resultant electrolyte membrane was boiled in 0.1M~10M sulfuric acid or phosphoric acid at 80° C. for at least two hours and washed twice or three times to provide a desired PAEEK composite electrolyte membrane.

1-2. Manufacture of Electrode

A catalyst (Pt/C), distilled water, a polymer electrolyte solution and IPA (isopropyl alcohol) were mixed in a ratio of 1:3:6:100 (Pt/C:H$_2$O:ionomer solution:IPA), and the mixture was agitated to provide catalyst slurry. To form a catalyst layer, 0~100% of an inorganic material may be further added to the catalyst slurry based on the weight of the ionomer. The catalyst slurry was applied onto a gas diffusion layer (GDL), such as carbon cloth or carbon paper, and dried at 80° C. for 3 hours to provide an electrode.

1-3. Manufacture of Membrane Electrode Assembly (MEA)

The electrolyte membrane obtained from Example 1-1 was laminated with the electrode obtained from Example 1-2 to provide a membrane electrode assembly (MEA).

1-4. Manufacture of Fuel Cell

Unit cells were manufactured by using the membrane electrode assembly. Then, hydrogen gas was supplied to the anode at a flow rate of 200 cc/min., and air was supplied to the cathode at a flow rate of 1000 cc/min.

EXAMPLE 2

ZSM-5 was dispersed in DMF as a solvent in a manner similar to the manner as described in Example 1. Then, a catalyst (Pt/C), distilled water, a polymer electrolyte solution and IPA (isopropyl alcohol) were mixed in a ratio of 1:3:6:1:100 (Pt/C:H$_2$O:ionomer solution:ZSM-5:IPA) and the mixture was agitated to provide catalyst slurry. The catalyst slurry was applied onto a gas diffusion layer (GDL), such as carbon cloth or carbon paper, and dried at 80° C. for 3 hours to provide an electrode.

A membrane electrode assembly and a fuel cell having the membrane electrode assembly were provided in the same manner as described in Example 1, except that the electrode obtained from Example 2 was used instead of the electrode obtained from Example 1-2.

EXAMPLE 3

An organic/inorganic composite electrolyte membrane, a membrane-electrode assembly and a fuel cell having the membrane-electrode assembly were provided in the same manner as described in Example 1, except that MCM-41 was used instead of ZSM-5.

EXAMPLE 4

An organic/inorganic composite electrolyte membrane, a membrane-electrode assembly and a fuel cell having the membrane-electrode assembly were provided in the same manner as described in Example 1, except that zeolite Y was used instead of ZSM-5.

COMPARATIVE EXAMPLE 1

An electrolyte membrane, a membrane-electrode assembly and a fuel cell having the membrane-electrode assembly were provided in the same manner as described in Example 1, except that 5 g of sulfonated polyaryleneetheretherketone (PAEEK, Korean Patent Application No. 10-2004-0110487) was used alone instead of the combination of the sulfonated PAEEK and zeolite.

COMPARATIVE EXAMPLE 2

A membrane-electrode assembly and a fuel cell having the membrane-electrode assembly were provided in the same manner as described in Example 1, except that Nafion 112 membrane was used instead of the organic/inorganic composite electrolyte membrane.

COMPARATIVE EXAMPLE 3

A membrane-electrode assembly and a fuel cell having the membrane-electrode assembly were provided in the same manner as described in Example 1, except that a recast Nafion membrane was used instead of the organic/inorganic composite membrane.

COMPARATIVE EXAMPLE 4

An electrolyte membrane (R-Nafion-ZSM-5 5%), a membrane-electrode assembly and a fuel cell having the membrane-electrode assembly were provided in the same manner as described in Example 1, except that 0.5 g of ZSM-5 was added to 22.5 g of a 20% Nafion polymer solution (Nafion polymer 4.5 g), the mixture was agitated for about 3~18 hours so that the mixture was dispersed, and the dispersion was filtered, instead of using the combination of the sulfonated PAEEK and zeolite.

EXPERIMENTAL EXAMPLE 1

Analysis of Organic/Inorganic Composite Electrolyte Membrane

The following experiment was performed to analyze the surface of the organic/inorganic composite electrolyte membrane according to the present invention.

Each of the organic/inorganic composite electrolyte membranes according to Examples 1, 3 and 4 was observed with a scanning electron microscope (SEM) to perform the surface analysis. After the observation, it could be seen that zeolite particles were distributed uniformly in each composite electrolyte membrane (see FIG. 1). It can be estimated from the above result that zeolite can provide its unique effect uniformly over the whole composite electrolyte membrane.

Figure 2:
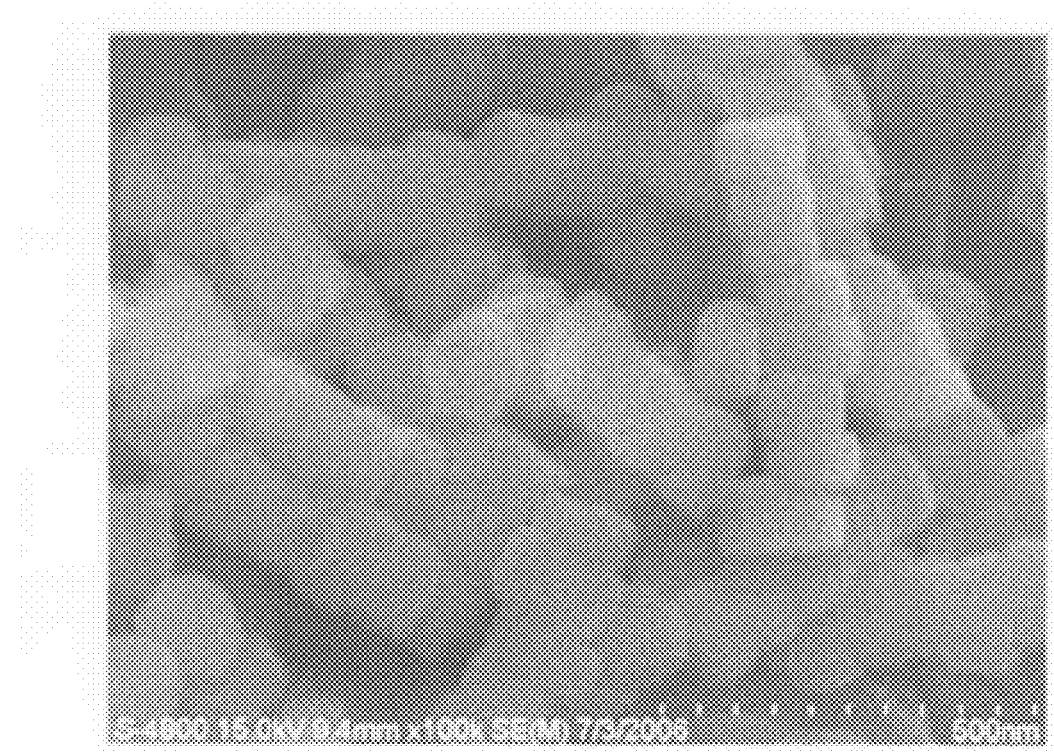
FIG. 2 is a photographic view showing the surface state of ZSM-5 particles, taken by transmission electron microscopy (TEM)
Figure 3:
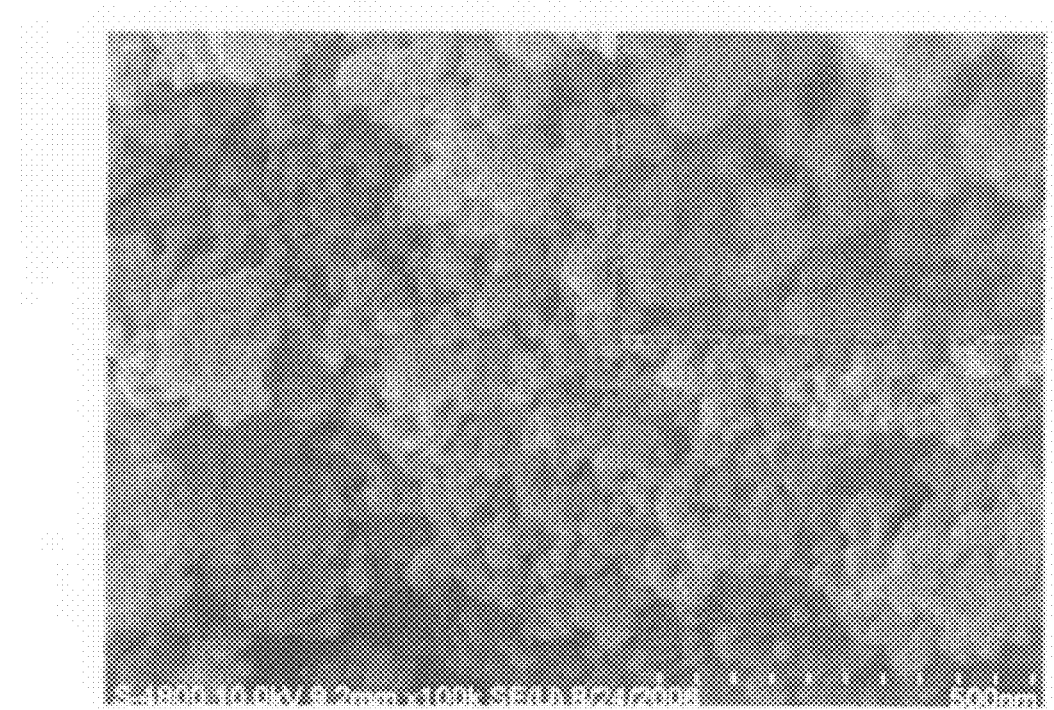
FIG. 3 is a photographic view showing the surface state of MCM-41 particles, taken by transmission electron microscopy (TEM)
Figure 4:
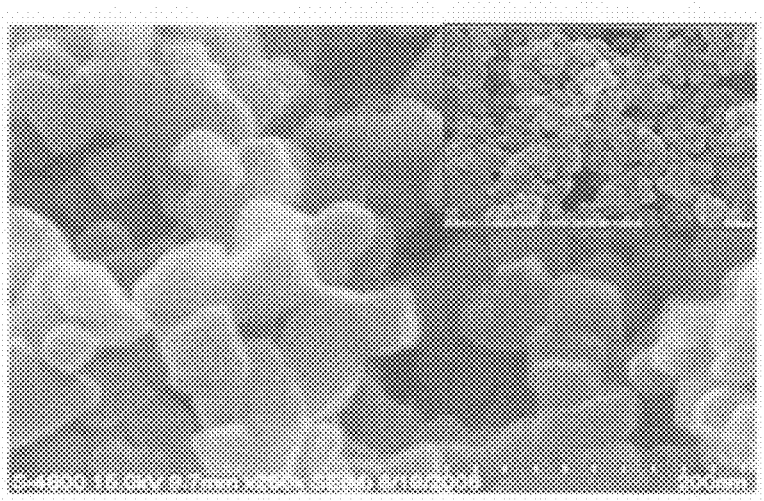
FIG. 4 is a photographic view showing the surface state of zeolite Y particles, taken by transmission electron microscopy (TEM)

Additionally, the zeolite particles (ZSM-5, MCM-41 and zeolite Y) used in the present invention were analyzed by TEM (transmission electron microscopy). After the analysis, it can be seen that the zeolite particles have a uniform diameter of about 20~100 nm (see FIGS. 2~4).

EXPERIMENTAL EXAMPLE 2

Evaluation of Physical Properties of Organic/Inorganic Composite Electrolyte Membrane The following test was performed to evaluate the physical properties of the organic/inorganic composite electrolyte membrane according to Example 1-1, the sulfonated fluorine-free electrolyte membrane according to Comparative Example 1 and the conventional Nafion 115 membrane according to Comparative Example 2.

2-1. Measurement of Proton Conductivity

A ZAHNER IM-6 impedance analyzer was used for the proton conductivity measurement. The proton conductivity of each electrolyte membrane sample was measured in a frequency range of 1 Hz~1 MHz by using the Potentio-static 4-probe system, at 70° C. under a humidity of 100%~40%. The results are shown in the following Table 1.

After the measurement, it can be seen that the organic/inorganic composite electrolyte membrane according to the present invention has significantly higher proton conductivity when compared to the conventional Nafion membrane, as well as the sulfonated fluorine-based polymer electrolyte membrane according to Comparative Example 1 (see Table 1). This indicates that the hydrophilic zeolite and the hydrophilic sulfonated fluorine-free hydrocarbon-based polymer forming the organic/inorganic composite electrolyte membrane according to the present invention cooperate organically with each other to attract moisture and to form a kind of proton conductive channel on the electrolyte membrane, and thus show improved proton conductivity.

2-2. Measurement of Methanol Crossover

The methanol crossover of each electrolyte membrane was measured by using a diffusion cell device.

First, 10M aqueous methanol solution was introduced into the left cell and pure water was introduced into the right cell. Each electrolyte membrane was inserted between the cells. The methanol crossover was measured from variances in the methanol concentration (Ci(t)) in the right cell as a function of time, while sampling the solution from the right cell. The results are shown in the following Table 1. The test was performed at room temperature (25° C.).

After the test, the Nafion membrane, a kind of fluoropolymer membrane, showed high methanol crossover, as known in the art. On the contrary, the electrolyte membranes comprising a fluorine-free hydrocarbon-based polymer according to Comparative Example 1 and Example 1 showed a significant drop in the methanol crossover. Particularly, the organic/inorganic composite electrolyte membrane according to the present invention significantly inhibited the methanol crossover as compared to the electrolyte membrane according to Comparative Example 1 (see Table 1).

TABLE 1

| Type | 100% Conductivity | 40% Conductivity | Methanol crossover (cm$^2$/s) |
|---|---|---|---|
| Comp. Ex. 2 (Nafion115) | 0.139 S/cm | 0.02 S/cm | 2.67 × 10$^{-6}$ |
| Comp. Ex. 1 | 0.162 S/cm | 0.01 S/cm | 0.89 × 10$^{-6}$ |
| Ex. 1 | 0.187 S/cm | 0.035 S/cm | 0.732 × 10$^{-6}$ |

EXPERIMENTAL EXAMPLE 3

Analysis of Quality of Fuel Cell

Fuel cells having the organic/inorganic composite electrolyte membranes according to Examples 1~3, the sulfonated fluorine-free polymer electrolyte membrane according to Comparative Example 1, the Nafion membranes according to Comparative Examples 2 and 3 and the Nafion/zeolite composite electrolyte membrane according to Comparative Example 4 were used to perform a test for evaluating the quality of each unit cell.

Figure 5:
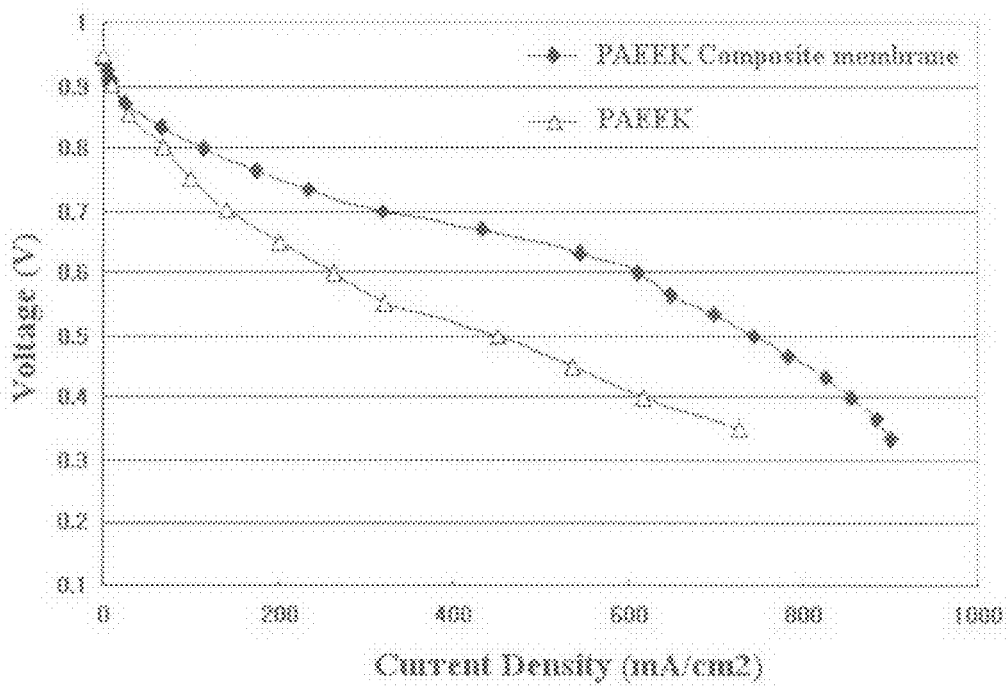
FIG. 5 is a graph showing the quality of the fuel cell using the organic/inorganic composite electrolyte membrane according to Example 1 under a low-humidity condition (relative humidity 40%, cell temperature 70° C.), as compared to the fuel cell using the organic electrolyte membrane according to Comparative Example 1 under the same condition.

To evaluate the quality of the fuel cells, an Arbin PEMFC test station system was used under the conditions of a cell temperature of 70° C., an effective cell area of 25 cm$^2$, a hydrogen flow rate of 200 cc/m, and an air flow rate of 1000 cc/m. Each fuel cell was driven under atmospheric pressure, and the temperature of the humidifier was varied in different ranges to observe the quality of each fuel cell under a relative humidity of 40%~100%. FIG. 5 shows the quality of each fuel cell under a low-humidity condition (relative humidity 40%, 70° C.).

After the test, the fuel cell having the organic/inorganic composite electrolyte membrane according to the present invention had quality comparable to the quality of the fuel cell having the conventional Nafion membrane according to Comparative Example 2. This demonstrates that the combination of zeolite with the sulfonated fluorine-free polymer provides high proton conductivity, and thus imparts excellent quality to the fuel cell even under high-temperature and low-humidity conditions (see FIG. 5 and Table 2).

TABLE 2

| Membrane | Cell temp. (° C.) Relative humidity (%) THK(micro) | 70° C. 100% Current density (mA/cm$^2$) | 70° C. 40% Current density (mA/cm$^2$) |
|---|---|---|---|
| Comp. Ex. 2 (Nafion112) | 50 | 710 | ≈680 |
| Comp. Ex. 3 (Recast Nation) | 64 | 655 | 640 |
| Comp. Ex. 1 (PAEEK) | 33 | 730 | 220-230 |
| Ex. 1 (PAEEK + ZSM-5 10%) | 24 | 720 | 680 |
| Ex. 3 (PAEEK + MCM41 10%) | 36 | 770 | 640 |

INDUSTRIAL APPLICABILITY

As can be seen from the foregoing, the organic/inorganic composite electrolyte membrane according to the present invention shows high proton conductivity, and thus can impart excellent quality to a fuel cell, even under high-temperature and low-humidity conditions.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An organic/inorganic composite electrolyte membrane comprising:
   (a) a sulfonated multiblock copolymer comprising repeating units represented by Formula 1; and
   (b) inorganic particles capable of collecting moisture, wherein the inorganic particles comprise zeolite,

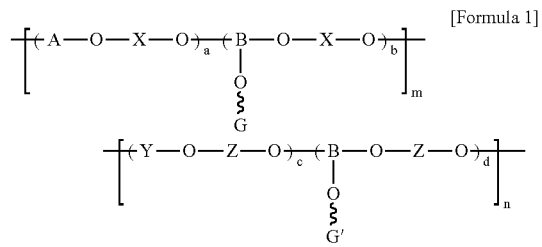

[Formula 1]

wherein each of A, X and Y independently represents

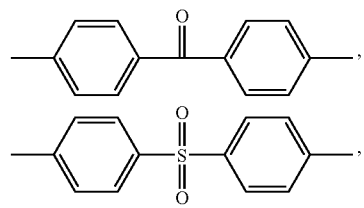

-continued
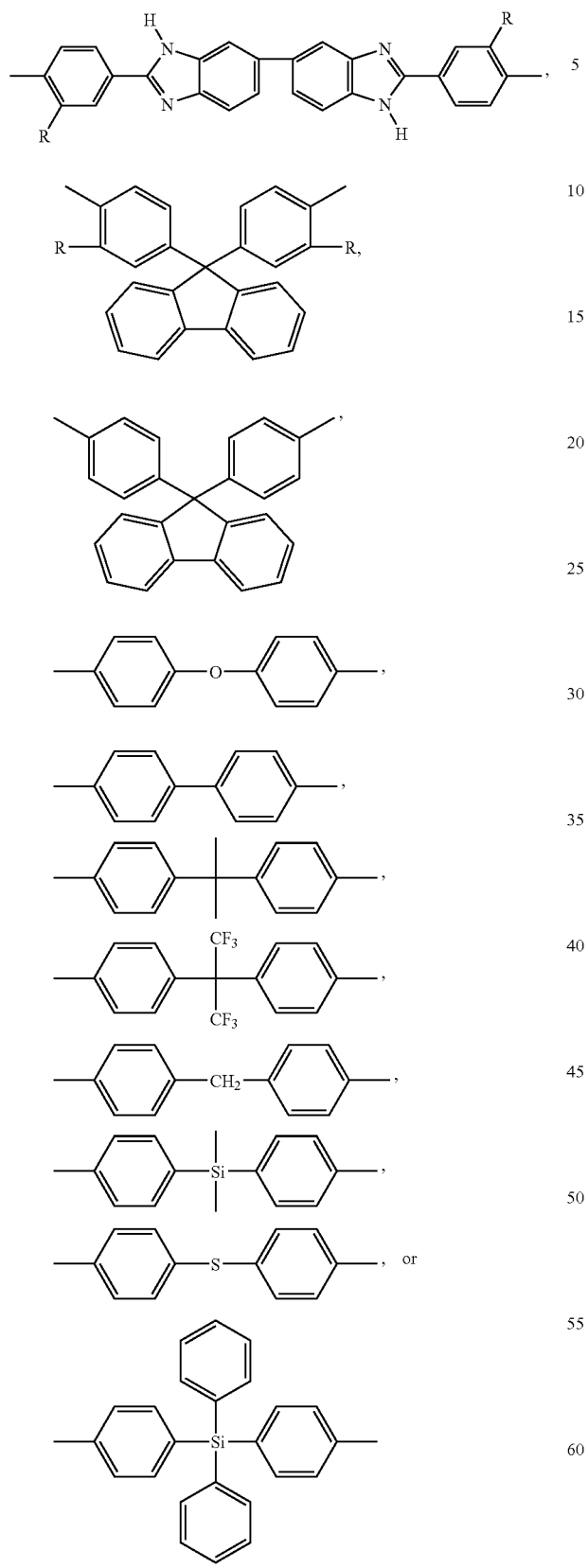
(wherein R is —NO, or —CF₃);
Z is
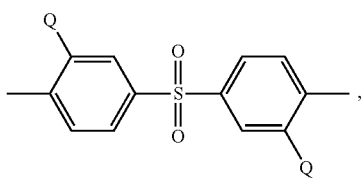
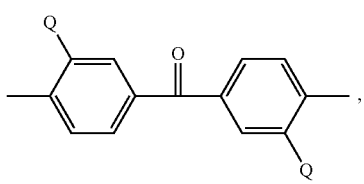
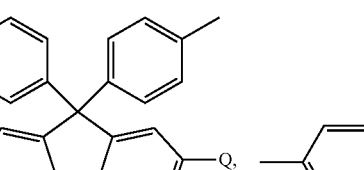
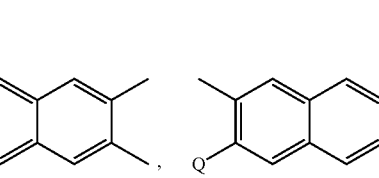
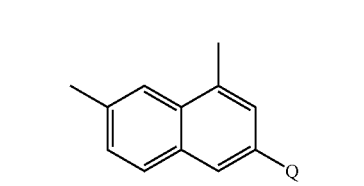
(wherein Q is —SO₃H, —SO₃⁻M⁺, —COOH, —COO⁻M⁺, —PO₃H₂, —PO₃H⁻M⁻, or —PO₃²⁻2M⁻, and M is Na or K);
B is
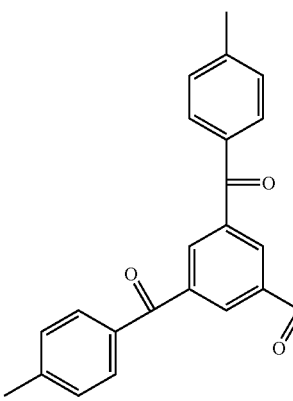

-continued

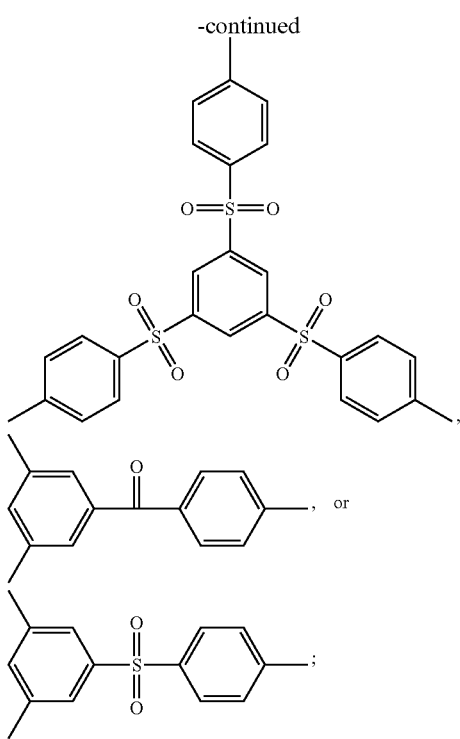

G is X;
G' is Z;
0<b/a<1;
0<d/c<1;
1≦n<100; and
1≦n<100.

2. The organic/inorganic composite electrolyte membrane as claimed in claim 1, wherein the zeolite comprises hydrates of aluminosilicates containing an element selected from alkali metal and alkaline earth metal elements.

3. The organic/inorganic composite electrolyte membrane as claimed in claim 1, wherein the zeolite has a three-dimensional polyhedral structure comprising $(Si,Al)O_4$ tetrahedrons as crystallographic basic units, linked to each other via chemical bonding.

4. The organic/inorganic composite electrolyte membrane as claimed in claim 1, wherein the zeolite has an acidity of pH 1~4.

5. The organic/inorganic composite electrolyte membrane as claimed in claim 1, wherein the zeolite is at least one selected from the group consisting of ZSM-5, zeolite A, zeolite X, zeolite Y, Mordenite, $AlPO_4$, SAPO, MeAlPO, SAPO-5, XSM-5, AlPO-5, VPI-5, MCM-41, Chabazite, Clipptiolite, silica gel, zirconium-containing minerals, titanium-containing minerals and silicates.

6. The organic/inorganic composite electrolyte membrane as claimed in claim 1, wherein the zeolite has a size (particle diameter) of 0.1 nm ~1μm.

7. The organic/inorganic composite electrolyte membrane as claimed in claim 1, wherein the zeolite is used in an amount of 0.1~1000 parts by weight per 100 parts by weight of the sulfonated fluorine-free hydrocarbon-based polymer.

8. The organic/inorganic composite electrolyte membrane as claimed in claim 1, wherein the sulfonated fluorine-free hydrocarbon-based polymer is a block copolymer having a block enriched with sulfonic acid groups.

9. The organic/inorganic composite electrolyte membrane as claimed in claim 1, wherein the repeating unit represented by Formula 1 is obtained by polymerizing branched hydrophobic blocks with branched hydrophilic blocks, and has the hydrophobic blocks and hydrophilic blocks linked alternately with each other via chemical bonding.

10. The organic/inorganic composite electrolyte membrane as claimed in claim 1, wherein the electrolyte membrane provides improved proton conductivity due to the hydrophilic zeolite and sulfonated fluorine-free hydrocarbon-based polymer cooperating with each other to collect moisture.

* * * * *